(12) United States Patent
Peck (10) Patent No.: US 10,782,034 B2
(45) Date of Patent: Sep. 22, 2020

(54) SYSTEM FOR CONDITIONING AN AIRFLOW USING A PORTABLE CLOSED LOOP COOLING SYSTEM

(71) Applicant: RK Mechanical, Inc., Denver, CO (US)

(72) Inventor: Scott K. Peck, Superior, CO (US)

(73) Assignee: RK Mechanical, Inc., Denver, CO (US)

( * ) Notice: Subject to any disclaimer, the term of this patent is extended or adjusted under 35 U.S.C. 154(b) by 170 days.

(21) Appl. No.: 15/841,071

(22) Filed: Dec. 13, 2017

(65) Prior Publication Data

US 2019/0178505 A1 Jun. 13, 2019

(51) Int. Cl.

| | | |
|---|---|---|
| *F24F 1/0007* | (2019.01) | |
| *F24F 1/04* | (2011.01) | |
| *F24F 1/26* | (2011.01) | |
| *F24F 11/84* | (2018.01) | |
| *F24F 11/85* | (2018.01) | |
| *F24F 3/00* | (2006.01) | |
| *F24F 140/20* | (2018.01) | |
| *F24F 1/38* | (2011.01) | |
| *F24F 110/12* | (2018.01) | |
| *F24F 1/0035* | (2019.01) | |
| *F24F 11/00* | (2018.01) | |

(52) U.S. Cl.
CPC .............. *F24F 1/0007* (2013.01); *F24F 1/04* (2013.01); *F24F 1/26* (2013.01); *F24F 3/001* (2013.01); *F24F 11/84* (2018.01); *F24F 11/85* (2018.01); *F24F 1/0035* (2019.02); *F24F 1/38* (2013.01); *F24F 2011/0006* (2013.01); *F24F 2110/12* (2018.01); *F24F 2140/20* (2018.01); *F24F 2221/36* (2013.01)

(58) Field of Classification Search
CPC ............ F24F 1/0007; F24F 11/85; F24F 1/04
See application file for complete search history.

(56) References Cited

U.S. PATENT DOCUMENTS

| | | | | |
|---|---|---|---|---|
| 3,675,441 | A * | 7/1972 | Perez ........................ | F25B 1/00 62/278 |
| 4,272,967 | A * | 6/1981 | White ..................... | B64F 1/364 62/236 |
| 4,621,501 | A * | 11/1986 | Tanaka ...................... | F25B 1/00 62/199 |
| 6,449,969 | B1 * | 9/2002 | Fujimoto .............. | F25B 25/005 62/180 |
| 6,450,133 | B1 * | 9/2002 | Bernard .................... | F01P 5/04 123/2 |

(Continued)

*Primary Examiner* — Nelson J Nieves
(74) *Attorney, Agent, or Firm* — Polsinelli PC (57) ABSTRACT

The present disclosure involves a free cooling temperature conditioning system having an air handling assembly having a first cooling coil. The first cooling coil includes an intake port receiving coolant at a first temperature and further includes an output port for the coolant at a second temperature. The air handing assembly receives return air flow from a space being temperature conditioned, where the return air flows over the first cooling coil to condition the return air to supply air. The air handing assembly delivers the supply air into the space being temperature conditioned. The conditioning system also includes a controller configured to maintain a temperature difference between the second temperature and the first temperature.

11 Claims, 7 Drawing Sheets

(56) References Cited

U.S. PATENT DOCUMENTS

| | | | | |
|---|---|---|---|---|
| 7,864,530 B1* | 1/2011 | Hamburgen | ........ | H05K 7/20827 |
| | | | | 165/104.33 |
| 8,839,638 B2* | 9/2014 | Kashirajima | ........... | F25B 25/00 |
| | | | | 62/259.2 |
| 9,016,087 B2* | 4/2015 | Urbain | .................... | B64F 1/364 |
| | | | | 62/519 |
| 9,377,164 B2* | 6/2016 | Utal | ........................ | F17C 5/007 |
| 9,909,790 B2* | 3/2018 | Pham | ...................... | F25B 25/00 |
| 10,087,088 B2* | 10/2018 | James | .................... | F24F 5/0046 |
| 2008/0016890 A1* | 1/2008 | Dominguez | .............. | F24F 3/06 |
| | | | | 62/201 |
| 2008/0029250 A1* | 2/2008 | Carlson | ................ | F24F 11/0001 |
| | | | | 165/104.33 |
| 2009/0171512 A1* | 7/2009 | Duncan | ................. | F24F 5/0035 |
| | | | | 700/300 |
| 2010/0031676 A1* | 2/2010 | Urbain | ................... | B64F 1/364 |
| | | | | 62/89 |
| 2013/0180267 A1* | 7/2013 | Hartig | ....................... | F25C 1/00 |
| | | | | 62/62 |
| 2013/0283835 A1* | 10/2013 | Katoh | ................ | B60H 1/00328 |
| | | | | 62/180 |
| 2014/0096930 A1* | 4/2014 | Krug, Jr. | ............ | H05K 7/20781 |
| | | | | 165/11.1 |
| 2015/0066263 A1* | 3/2015 | Abihana | ................. | F01P 7/164 |
| | | | | 701/22 |
| 2018/0080697 A1* | 3/2018 | Okuda | .................. | F25B 49/027 |
| 2018/0147911 A1* | 5/2018 | Woo | .................... | B60H 1/00057 |
| 2018/0354341 A1* | 12/2018 | Mer | .................. | B60H 1/00807 |
| 2019/0039437 A1* | 2/2019 | Jentz | .................. | B60H 1/00978 |
| 2019/0086112 A1* | 3/2019 | Simon | ..................... | F24F 3/065 |

* cited by examiner

SYSTEM FOR CONDITIONING AN AIRFLOW USING A PORTABLE CLOSED LOOP COOLING SYSTEM

TECHNICAL FIELD

The present disclosure relates to air conditioning systems, and in particular, a system for conditioning an airflow using a portable closed loop cooling system having a free cooling system.

BACKGROUND

In a conventional air conditioning unit, a portion of the air conditioning unit is inside the space to be conditioned while other portions of the air conditioning unit are outside of the space and exposed to outside air. Typically, air conditioning systems are fixed. In other words, conventional air conditioning units are integrated into the building or space and are generally not movable or reusable. In conventional air conditioning units, the unit is typically controlled by monitoring the temperature of the air inside the space, such as with a thermostat. Typically, if the temperature is above a desired temperature, the air conditioning unit will turn on to condition the air, regardless of the difference in the desired temperature and the temperature. If the desired temperature is one or two degrees above the actual temperature, the air conditioning unit will turn on. This may lead to inefficient use of the air conditioning unit as the unit will be working as hard to cool the air one or two degrees as it would to cool the air five to ten degrees.

It is with these observations in mind, among others, that various aspects of the present disclosure were conceived and developed.

SUMMARY

One implementation provides for a free cooling temperature conditioning system. The conditioning system includes an air handling assembly having a first cooling coil. The first cooling coil includes an intake port receiving coolant at a first temperature and further includes an output port for the coolant at a second temperature. The air handing assembly further receives return air flow from a space being temperature conditioned, where the return air flows over the first cooling coil to condition the return air to supply air. The air handing assembly also delivers the supply air into the space being temperature conditioned. The conditioning system also includes a pump operably coupled with a coolant system to control the flow of coolant into the input port and a valve operably coupled with the coolant system to control the flow of coolant from the output port.

The conditioning system also includes a controller configured to maintain a temperature difference between the second temperature and the first temperature. The controller generates a first control signal to at least one of the pump and the valve to decrease the flow of coolant from the output port or the flow of coolant into the input port when an actual temperature difference between the second temperature and the first temperature is less than the temperature difference. The controller generates a second control signal to at least one of the pump and the valve to increase the flow of coolant from the output port or the flow of coolant into the input port when an actual temperature difference between the second temperature and the first temperature is greater than the temperature difference.

In another implementation, a free cooling temperature conditioning system is provided. The conditioning system includes a mobile platform defining a support surface of about 53 feet by 8.5 feet and defining a first end and a second end, wherein the second end is opposite the first end. The mobile platform also defines a first side and a second side, wherein the first side and the second side extend between the first end and the second end and the first side is positioned opposite the second side. The conditioning system also includes an air handling assembly positioned adjacent to the first end and extends from the first side to the second side. The air handling assembly includes a first cooling coil having an intake port receiving coolant at a first temperature. The first cooling coil also includes an output port for the coolant at a second temperature. The air handing assembly also receives return air flow from a space being temperature conditioned. The return air flows over the first cooling coil to condition the return air to supply air. The air handing assembly also delivers the supply air into the space being temperature conditioned.

The conditioning system also includes a first pump and a second pump, which are positioned proximate the second end and proximate the second side. The first pump is operably coupled with a coolant system to control the flow of coolant into the input port and the second pump is operable to control the flow of coolant through the coolant system if the first pump fails. The conditioning system further includes a valve operably coupled with the coolant system to control the flow of coolant from the output port and a controller configured to maintain a temperature difference between the second temperature and the first temperature. The controller generates a first control signal to at least one of the pump and the valve to decrease the flow of coolant from the output port or the flow of coolant into the input port when an actual temperature difference between the second temperature and the first temperature is less than the temperature difference. The controller also generates a second control signal to at least one of the pump and the valve to increase the flow of coolant from the output port or the flow of coolant into the input port when an actual temperature difference between the second temperature and the first temperature is greater than the temperature difference.

In another implementation, a portable free cooling temperature conditioning system is provided. The conditioning system includes a mobile platform defining a support surface of about 53 feet by 8.5 feet and defines a first end and a second end, where the second end is opposite the first end. The conditioning system further defines a first side and a second side, where the first side and the second side extends between the first end and the second end and the first side is positioned opposite the second side. The conditioning system also includes an air handling assembly positioned adjacent the first end and extends from the first side to the second side. The air handling assembly includes an air intake positioned at the first end and an air output positioned at the proximal end and adjacent to the intake air. The air intake is configured to receive a return air and the air output is configured to eject a supply air. The air handling assembly further includes a first cooling coil receiving coolant at a first intake port and ejecting the coolant at a first output port. The cooling coil is configured to cool the return air to the supply air.

The conditioning system also includes an air separator positioned proximate the second side. The air separator receives the coolant from the first output port via a first pipe and is configured to remove air from the coolant. The conditioning system also includes a first pump and a second pump positioned proximate the second end and proximate the second side. The first pump and the second pump receive the coolant from the air separator via a second pipe. The first pump is configured to control the flow of coolant through a coolant system and the second pump is configured to control the flow of coolant through the coolant system if the first pump fails. The conditioning system further includes an expansion tank positioned proximate the second side and proximate the air handling assembly. The expansion tank is coupled to the second pipe via an expansion pipe and is configured to maintain a system pressure in the coolant. The conditioning system also includes a chemical feeder tank positioned proximate the second side and adjacent to the first pump and the second pump. The chemical feeder is coupled to the second pipe via a chemical feeder pipe and is configured to provide chemicals to the coolant via the chemical feeder pipe.

The conditioning system further includes an air cooled chiller assembly positioned adjacent to the first side. The air cooled chiller assembly includes a first end adjacent to the air handling assembly and a second end adjacent to the second end. The air cooled chiller assembly also includes a second cooling coil, which receives the coolant at a second intake port from the first pump or the second pump and ejects the coolant at a second output port. The air cooled chiller assembly further includes a compressor located below the cooling coil and above the support surface. The compressor is configured to receive and cool the coolant from the second output port. The air cooled chiller assembly also includes a storage tank positioned proximate the second side and between the expansion tank and the air handing assembly. The storage tank receives the coolant from the air cooled chiller at a third intake port and ejects the coolant at a third output port to the air handling assembly. The storage tank is configured to provide coolant to the air handing assembly during a power outage for a first timeframe.

In another implementation, a portable free cooling temperature conditioning system is provided. The conditioning system includes a mobile platform defining a support surface of about 53 feet by 8.5 feet. The mobile platform also defines a first end and a second end, where the second end is opposite the first end. The mobile platform further defines a first side and a second side, where the first side and the second side extend between the first end and the second end and the first side is positioned opposite the second side. The conditioning system also includes an air handling assembly positioned adjacent the first end and extending from the first side to the second side. The air handling assembly includes an air intake positioned at the first end and an air output positioned at the proximal end and adjacent to the intake air. The air intake is configured to receive a return air from a space being temperature conditioned and the air output is configured to eject a supply air. The air handling assembly further includes a first cooling coil, which receives coolant at a first intake port and ejects the coolant at a first output port. The air handling assembly also includes the return air flowing over the first cooling coil to condition the return air to supply air and delivers the supply air into the space being temperature conditioned. The air handling assembly further includes a valve operably coupled with the coolant system to control the flow of coolant from the output port.

The conditioning system further includes a controller positioned within the air handling assembly. The controller is configured to maintain a temperature difference between the second temperature and the first temperature. The controller generates a first control signal to at least one of the pump and the valve to decrease the flow of coolant from the output port or the flow of coolant into the input port when an actual temperature difference between the second temperature and the first temperature is less than the temperature difference. The controller also generates a second control signal to at least one of the pump and the valve to increase the flow of coolant from the output port or the flow of coolant into the input port when an actual temperature difference between the second temperature and the first temperature is greater than the temperature difference. The conditioning system also includes an air separator positioned proximate the second side and receives the coolant from the first output port via a first pipe. The air separator is configured to remove air from the coolant.

The conditioning system further includes a first pump and a second pump positioned proximate the second end and proximate the second side. The first pump and the second pump are operably coupled with the coolant system to control the flow of coolant from an output port. The first pump and the second pump receive the coolant from the air separator via a second pipe and the second pump is configured to control the flow of coolant through the coolant system if the first pump fails. The conditioning system also includes an expansion tank positioned proximate the second side and proximate the air handling assembly. The expansion tank is coupled to the second pipe via an expansion pipe and is configured to maintain a system pressure in the coolant. The conditioning system also includes a chemical feeder tank positioned proximate the second side and adjacent to the first pump and the second pump. The chemical feeder is coupled to the second pipe via a chemical feeder pipe and is configured to provide chemicals to the coolant via the chemical feeder pipe.

The conditioning system further includes an air cooled chiller assembly positioned adjacent to the first side. The air cooled chiller assembly includes a first end adjacent to the air handling assembly and a second end adjacent to the second end. The air cooled chiller assembly includes a second cooling coil, which receives the coolant at a second intake port from the first pump or the second pump and ejects the coolant at a second output port. The air cooled chiller assembly further includes a compressor located below the cooling coil and above the support surface. The compressor is configured to receive the coolant from the second output port and to cool the coolant. The conditioning system also includes a storage tank positioned proximate the second side and between the expansion tank and the air handing assembly. The storage tank receives the coolant from the air cooled chiller at a third intake port and ejects the coolant at a third output port to the air handling assembly. The storage tank is configured to provide coolant to the air handing assembly during a power outage for a first timeframe.

In another implementation a free cooling temperature conditioning system is provided. The conditioning system includes an air handling assembly a first cooling coil. The first cooling coil includes an intake port receiving coolant at a first temperature and an output port for the coolant at a second temperature. The air handling assembly further receives return air flow from a space being temperature conditioned, where the return air flows over the first cooling coil to condition the return air to supply air. The air handling assembly also delivers the supply air into the space being temperature conditioned.

The conditioning system also includes a pump operably coupled with a coolant system to control the flow of coolant into the input port and a valve operably coupled with the coolant system to control the flow of coolant from the output port. The conditioning system also includes a controller configured to maintain a temperature difference between the second temperature and the first temperature. The controller generates a first control signal to at least one of the pump and the valve to decrease the flow of coolant from the output port or the flow of coolant into the input port when an actual temperature difference between the second temperature and the first temperature is less than the temperature difference. The controller also generates a second control signal to at least one of the pump and the valve to increase the flow of coolant from the output port or the flow of coolant into the input port when an actual temperature difference between the second temperature and the first temperature is greater than the temperature difference.

The conditioning system further includes a free cooling assembly having a second cooling coil. The free cooling assembly is configured to cool the coolant from the second temperature to a coolant set temperature if an outside ambient air temperature of an outside airflow is less than a threshold outside temperature. The free cooling assembly includes the outside airflow flowing over the second cooling coil to cool the coolant from the second temperature to the coolant set temperature. The fee cooling assembly also includes a compressor configured to mechanically cool the coolant from the second temperature to the coolant set temperature if the outside ambient air temperature is greater than the threshold outside temperature.

These and other aspects are disclosed in further detail in the description set out below.

DETAILED DESCRIPTION

A portable free cooling temperature conditioning system provides cooling to a large area within a compact, portable, and easy to use system. The conditioning system is arranged on a skid, which may be positioned on a semi-trailer such that it can be conventionally shipped by a semi-trailer truck, delivered, coupled to the building, and activated. When the conditioning system is delivered, the conditioning system on the skid can be removed from the semi-trailer and positioned on the ground to couple onto the building. The conditioning system can couple to the building by forming or cutting two apertures in the building which can receive two ductwork connections to deliver conditioned air and to receive air to be conditioned, respectively. The conditioning system can alternatively couple to the building by forming or cutting an aperture large enough to allow an air handing unit of the conditioning system to contact the building, positioning the conditioning system at the aperture, and sealing the conditioning system to the building.

The conditioning system may be fully self-sufficient and can be used for buildings of varying sizes. For example, the conditioning system does not rely upon control from the building automation system and instead relies on an on-board control system. Rather, the conditioning system relies on maintaining a constant discharge air temperature controlled by temperature sensors included within the skid, which supports portability of the system and enhances system efficiency. The conditioning system also features a free cooling system, which also contributes to system efficiency as free cooling uses less energy than mechanical cooling when the outside ambient air temperature is below a threshold ambient temperature. The free cooling system is also a closed system, which also allows the free cooling system to remain self-sufficient once it is installed within the conditioning system as water does not need to be continuously supplied during operation.

Figure 1:
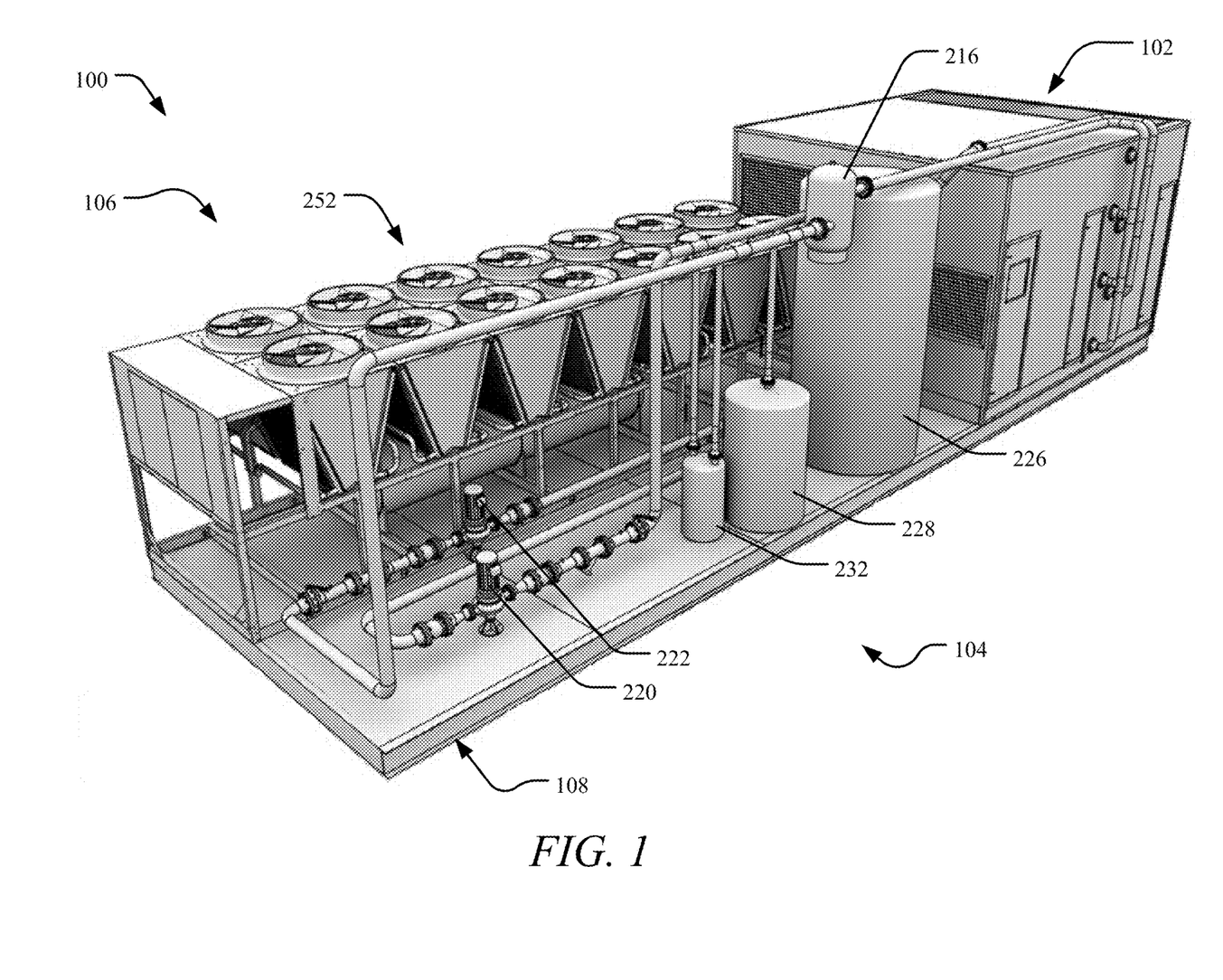
FIG. 1 illustrates a portable free cooling temperature conditioning system.
Figure 2:
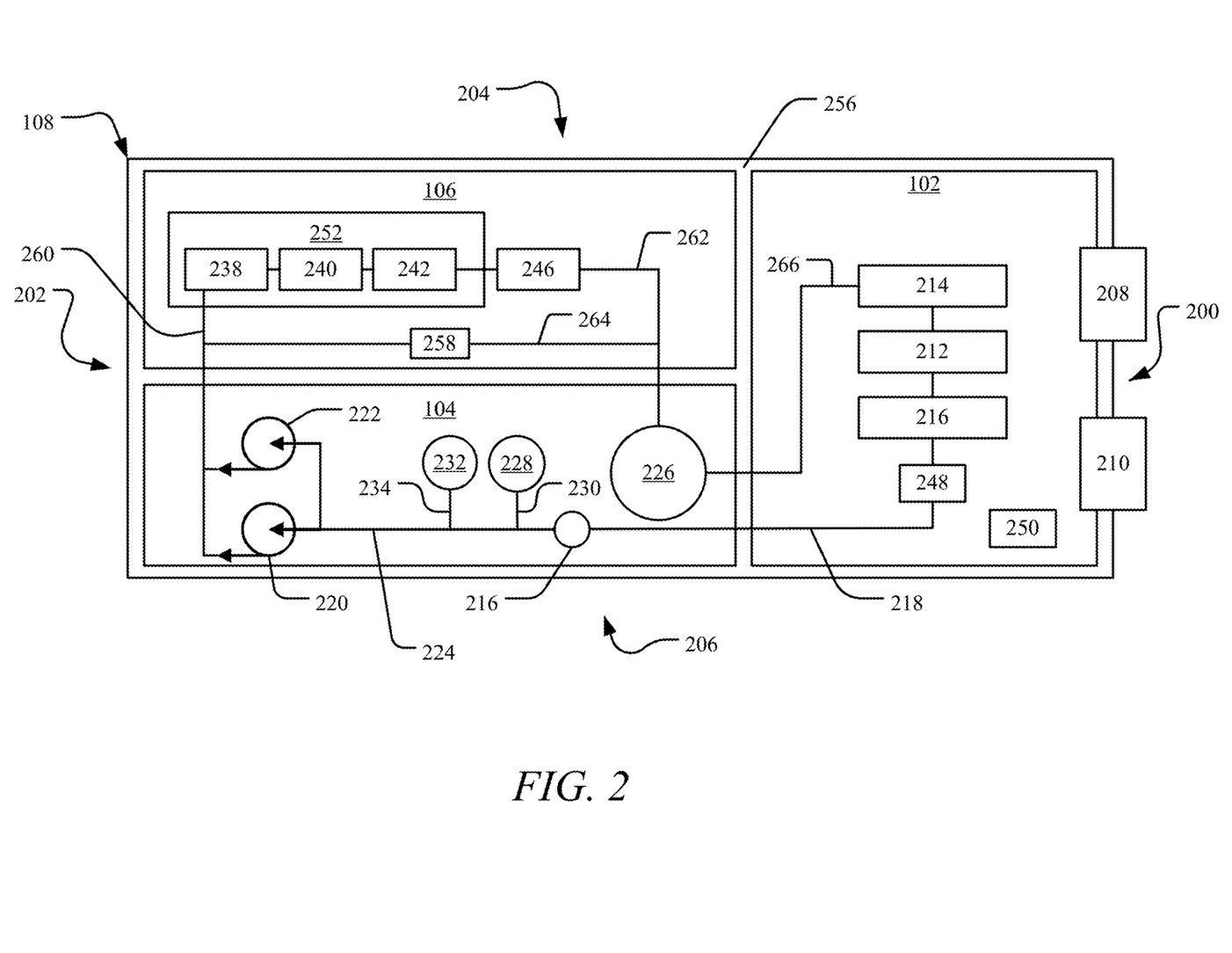
FIG. 2 depicts a top view of an arrangement of the portable free cooling temperature conditioning system.

Turning to the drawings, FIG. 1 is an isometric view of one implementation of a portable free cooling temperature conditioning system (conditioning system) 100, conforming to aspects of the present disclosure. FIG. 2 depicts a top view of an arrangement of the conditioning system 100. The conditioning system 100 generally includes an air handling assembly (AHA) 102 configured to receive, condition, and return an airflow, an air cooled chiller assembly (ACC) 106 configured to cool a coolant, and a coolant system 104 configured to circulate the coolant. The conditioning system 100 is uniquely arranged on a mobile platform 108 such that the entire conditioning system 100 is self-sufficient, optimized for efficiency and ease of use, capable of being shipped as one unit, and capable of supplying conditioned air at a large rate to a large volumetric area. For example, the conditioning system 100 can provide 75,000 cfm of conditioned air at 70 degrees.

The AHA 102 is sized and arranged to fit on a first end 200 of the mobile platform 108 such that the conditioning system 100 can be simply bolted onto the building with the AHA 102 having full access to the building to supply a conditioning airflow. In one example, the conditioning system 100 can couple to the building by forming or cutting a first aperture to receive a supply duct and a second aperture to receive a return duct in the building. The supply duct and the return duct deliver conditioned air and receive air to be conditioned, respectively, and attach to the AHU 102. In another example, the conditioning system 100 can alternatively couple to the building by forming or cutting an aperture large enough to allow the AHU 102 to contact the building, positioning the conditioning system 100 at the aperture, and sealing the conditioning system 100 to the building.

To optimize space, the ACC 106 is also uniquely sized and positioned on the mobile platform 108 to be adjacent to the AHA 102 such that the coolant travels a short distance to the AHA 102 after being cooled, which prevents heat loss from the coolant. Furthermore, the ACC 106 is a closed system and does not require a supply of water. After the ACC 106 is installed and initially supplied with water, the ACC 106, and thus the conditioning system 100, may be self-sufficient. Self-sufficiency provides the benefit of a simplified system as water does not need to be transported to the conditioning unit 100, which is useful in emergency situations such as a natural disaster, and helpful in locations which may be more remote or difficult to reach, such as a military base or remote data center. For example, large warehouses, gymnasiums, or buildings may be used to provide shelter to displaced people after a natural disaster. The conditioning system 100 can be delivered to the shelter, coupled to the shelter, and operated to provide conditioning air to the shelter, without the need to provide additional supplies or services to the conditioning system 100. The conditioning system 100 can also be delivered to a remote military base, where water or other supplies are not easily delivered or available.

The coolant system 104 is also uniquely positioned on the mobile platform 108, adjacent to both the AHA 102 and the ACC 106, and provides all the necessary power and piping to efficiently move the coolant from the AHA 102 to the ACC 106 and vice versa. The coolant system 104 is also positioned to provide immediate access to a pump 220, a chemical feeder tank 232, and an expansion tank 228, which is beneficial during routine maintenance as a user can simply walk up to the conditioning system 100 and access and perform maintenance on the coolant system 104. Furthermore, the coolant system 104 is arranged such that the heated coolant ejected from the AHA 102 travels a further distance than the cooled coolant delivered by the ACC 106 to the AHA 102. This arrangement is beneficial because loss of heat from the heated coolant is insignificant, as the coolant has already been used, and may be beneficial because the coolant may cool itself as it travels through the piping to the ACC 106. Stated differently, this arrangement enhances efficiency as less heat is lost during the transfer of cooled coolant from the ACC 106 to the AHA 102, and heat is lost during the transfer of heated coolant requiring cooling from the AHA 102 to the ACC 106.

The unique arrangement of the conditioning system 100 also provides a compact conditioning system 100 capable of being shipped as one unit. The mobile platform 108 can be, for example, a skid sized to fit on top of a standard semi-trailer of a semi-trailer truck, taking into account the width, length, and height required for on road transportation. The conditioning unit 100 can also be a permanent or temporary structure. For example, the conditioning system 100 can be reused for different shelters after a natural disaster or used during different natural disasters. In another example, the conditioning system 100 can be a permanent structure to provide conditioning to, for example, a data center.

Figure 3:
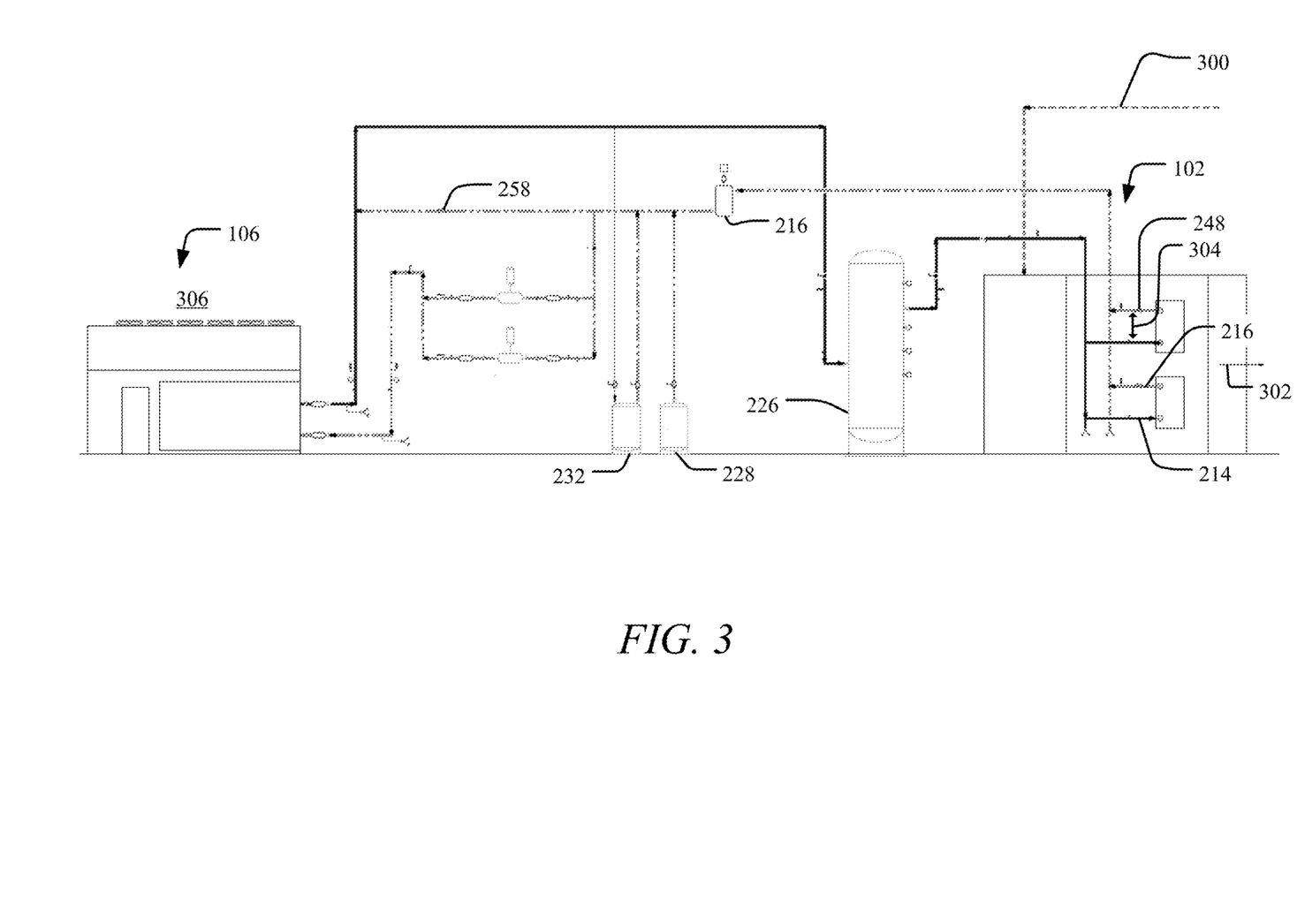
FIG. 3 is a flow chart illustrating a method of circulating and cooling a coolant and conditioning an airflow.
Figure 4:
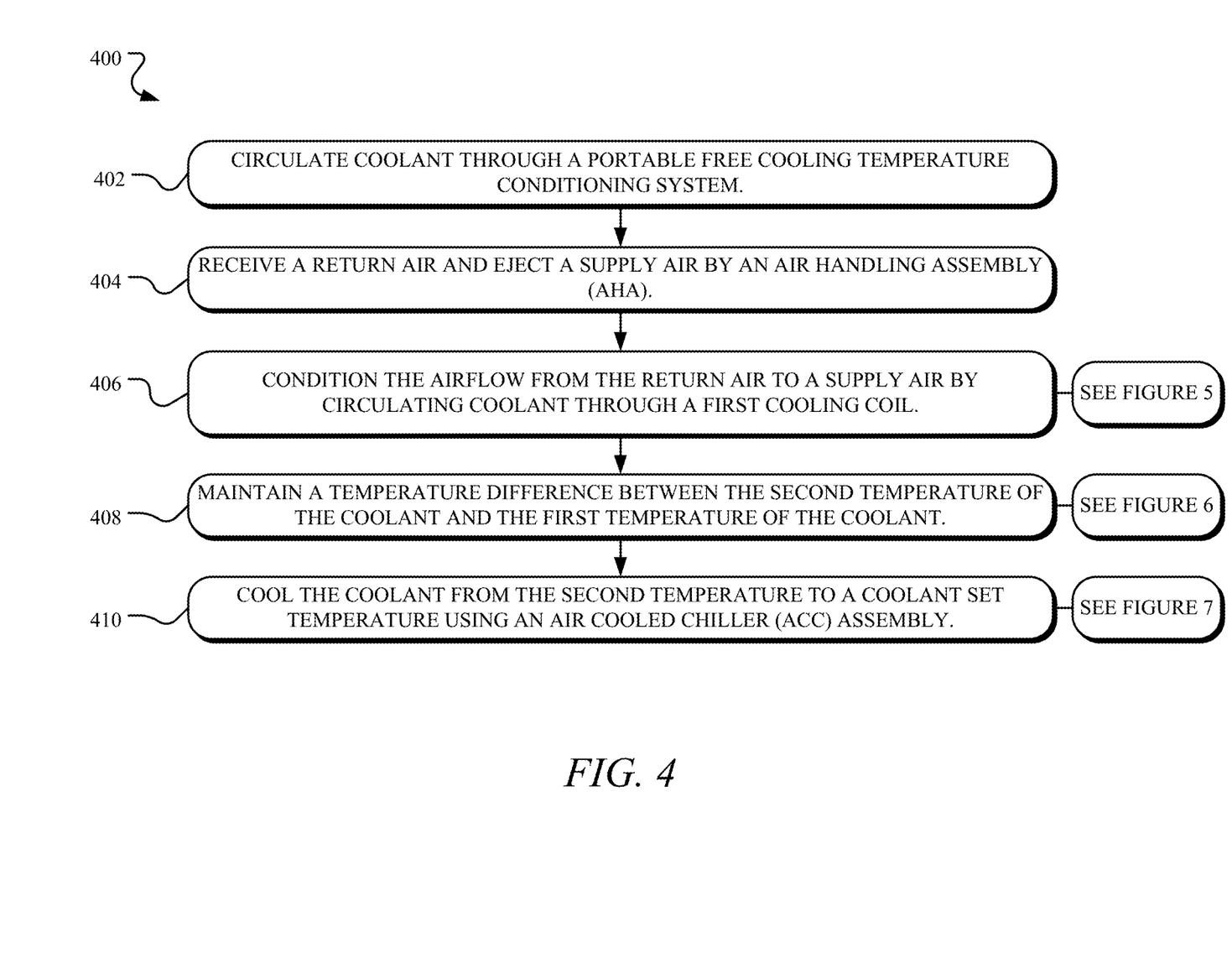
FIG. 4 is a flow chart illustrating a method for conditioning the airflow using the portable free cooling temperature conditioning system.

FIG. 4 is a flow chart illustrating a method for conditioning airflow 400 using the conditioning system 100. FIG. 3 is a flow chart illustrating a method of circulating and cooling a coolant and conditioning an airflow. Referring now to FIGS. 1-3, as well as FIG. 4, the AHA 102 is positioned on the mobile platform 108 adjacent to the first end 200 and extends from the first side 204 to the second side 206. The AHA 102 includes an air intake 208 positioned at the first end 200 and an air output 210 positioned at the first end 200 and adjacent to the air intake 208. The air intake 208 and the air outtake 210 are configured to receive a return air 300 and eject a supply air 302, respectively, as shown in operation 404 of FIG. 4. The return air 300 is received from a space being temperature conditioned, such as, but not limited to, a gym, warehouse, datacenter, or a temporary building structure. The return air 300 may vary according to the building, surroundings, and activities occurring within the building. For example, the return air 300 may increase in temperature due to the outside ambient air temperature increasing. The return air 300 may also increase due to equipment use within the building or an increase in the amount of people entering the building.

Figure 5:
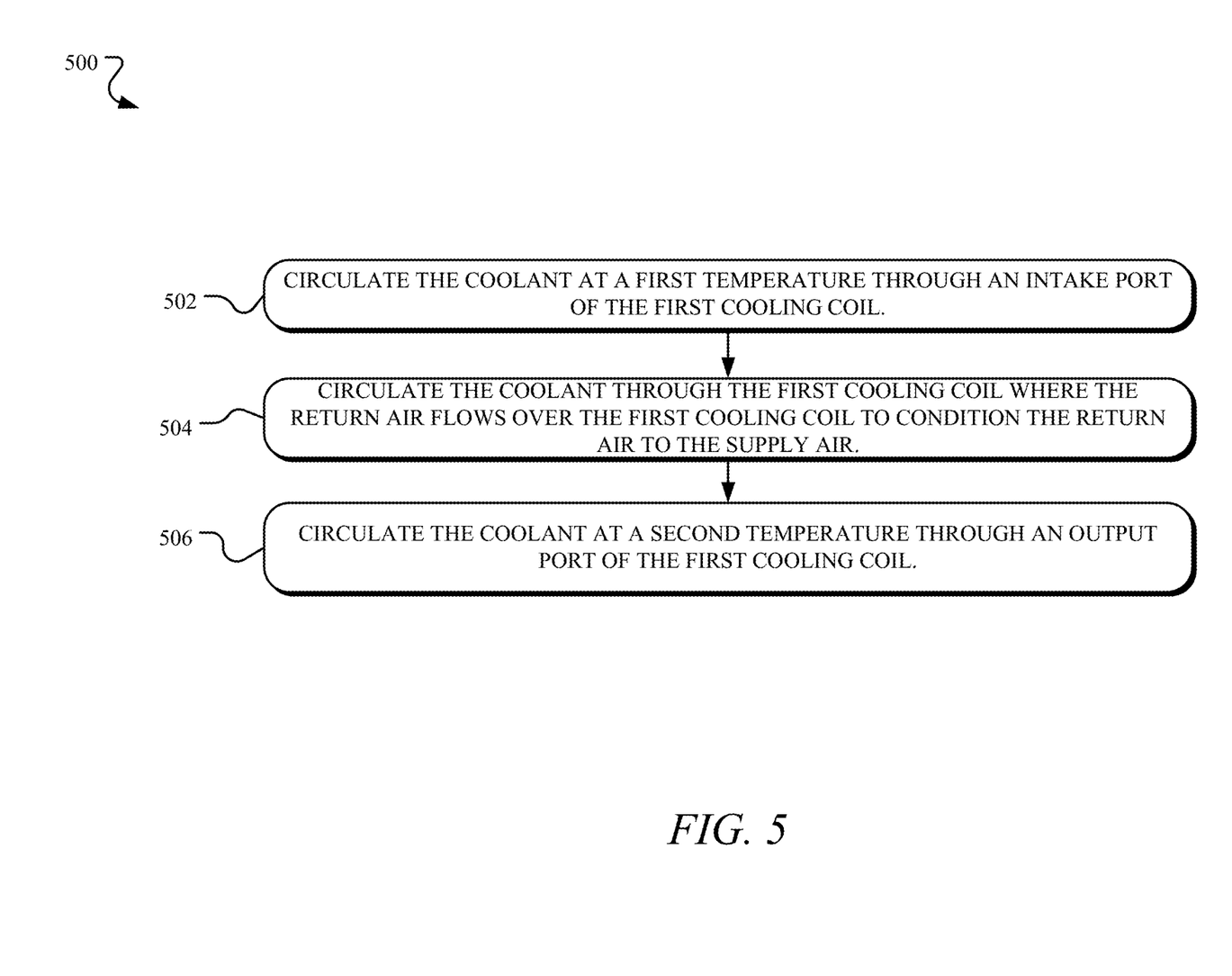
FIG. 5 is a flow chart illustrating a detailed method for conditioning the airflow using a coolant circulated through a first cooling coil.

The AHA 102 includes a first cooling coil 212 having an intake port 214 and an output port 216, through which coolant is circulated to cool the return air 300 to the supply air 302. A first operation 402 provides for circulating the coolant through the conditioning system 100. Turning to FIG. 5, a method 500 for conditioning the airflow from the return air 300 to the supply air 302 by circulating coolant through the first cooling coil 212 is shown. Operation 502 provides for circulating the coolant at a first temperature through the intake port 214. Operation 504 circulates the coolant through the first cooling coil 312, where the return air 300 flows over the first cooling coil 212 to condition the return air 300 to the supply air 302. In one example, the AHA 102 includes a fan operable to push the return air 300 over the first cooling coil 212. The coolant then exits at a second temperature, warmer than the first temperature, through the output port 214, shown in operation 506, and circulates through a valve 248, shown in FIGS. 2-3. The coolant then travels through the coolant system 104 to the ACC 106, where the coolant is cooled to the coolant set temperature, and then travels back to the AHA 102 to cool the return air 300 again. The valve 248, together with a pump 220, and a controller 250, shown in FIGS. 2-3, control the flow of coolant through the coolant system 104.

The flow of coolant is dependent on a temperature difference between the second temperature and the first temperature. The valve 248 is positioned on the outgoing pipe of the output port 216 and is configured to control the flow of coolant from the output port 216. The valve 248 can open to decrease flow of the coolant or close to increase flow of the coolant. The pump 220 is also configured to control the flow of coolant through the coolant system 104 and is positioned proximate the second end 202 and proximate the second side 206. The pump 220 and the valve 248 are configured to jointly control the flow of coolant, wherein the pump 220 is modulated to match the valve 248 to maintain a flow rate and proper pressure to maintain the constant temperature difference. In other words, when the valve 248 opens or closes and the flow rate decreases or increases, respectively, the pump 220 changes in speed to provide a pressure suitable for the system.

In one implementation, the conditioning system 100 has a first pump 220 and a second pump 222. The second pump 222 is configured to control the flow of coolant through the coolant system 104 if the first pump 220 fails. The conditioning system 100 may include a pump sensor configured to send a signal to the controller 250 to activate the second pump 222 if the first pump 220 fails. The first pump 220 and the second pump 222 can also alternate operation. For example, the first pump 220 and the second pump 223 can switch operation every 14 days. The controller 250 is positioned within the AHA 102 and is configured to maintain the temperature difference between the second temperature and the first temperature, shown in operation 408 of FIG. 4. In one implementation, the conditioning system 100 has one controller 250 to control the entire conditioning system 100. In another implementation, the conditioning system 100 has two controllers 250, one configured to control the valve 248 and the other configured to control the pump 220.

In use, the supply air 302 is ejected at a constant supply air temperature and the temperature difference across the coolant is controlled to also be a constant. Maintaining a constant temperature difference enhances efficiency of the conditioning system 100 as more of the work being produced by the ACC 106 to cool the coolant is utilized when the coolant cools the airflow. More specifically, efficiency is generally the energy or work output divided by the energy or work input. The ACC 106 produces an amount of work, or work input, to cool the coolant. If the coolant transfers a low amount of the energy stored in the coolant to the supply air, the system is less efficient because the energy used to cool the coolant is not utilized. In other words, the coolant has a low energy output during the heat transfer, and thus, a low efficiency. If the coolant transfers a larger amount of the energy stored in the coolant to the supply air, then the system is more efficient as more of the energy is utilized. In other words, the coolant has a high energy output during the heat transfer, and thus, a high efficiency. Thus, maintaining a constant temperature difference is beneficial as a constant amount of energy is utilized in the heat transfer between the coolant and the air, which leads to a constant efficiency. In other words, maintaining a high temperature difference ensures a high energy output and a high efficiency. An efficient system may save an operator on costs as less energy will be lost or wasted. In one example, the temperature difference is 20 degrees. Because the return air 300 may change, thus changing the amount of energy needed to keep the temperature difference constant and to cool the airflow, the flowrate of the coolant is adjusted to account for the difference in energy needed.

Figure 6:
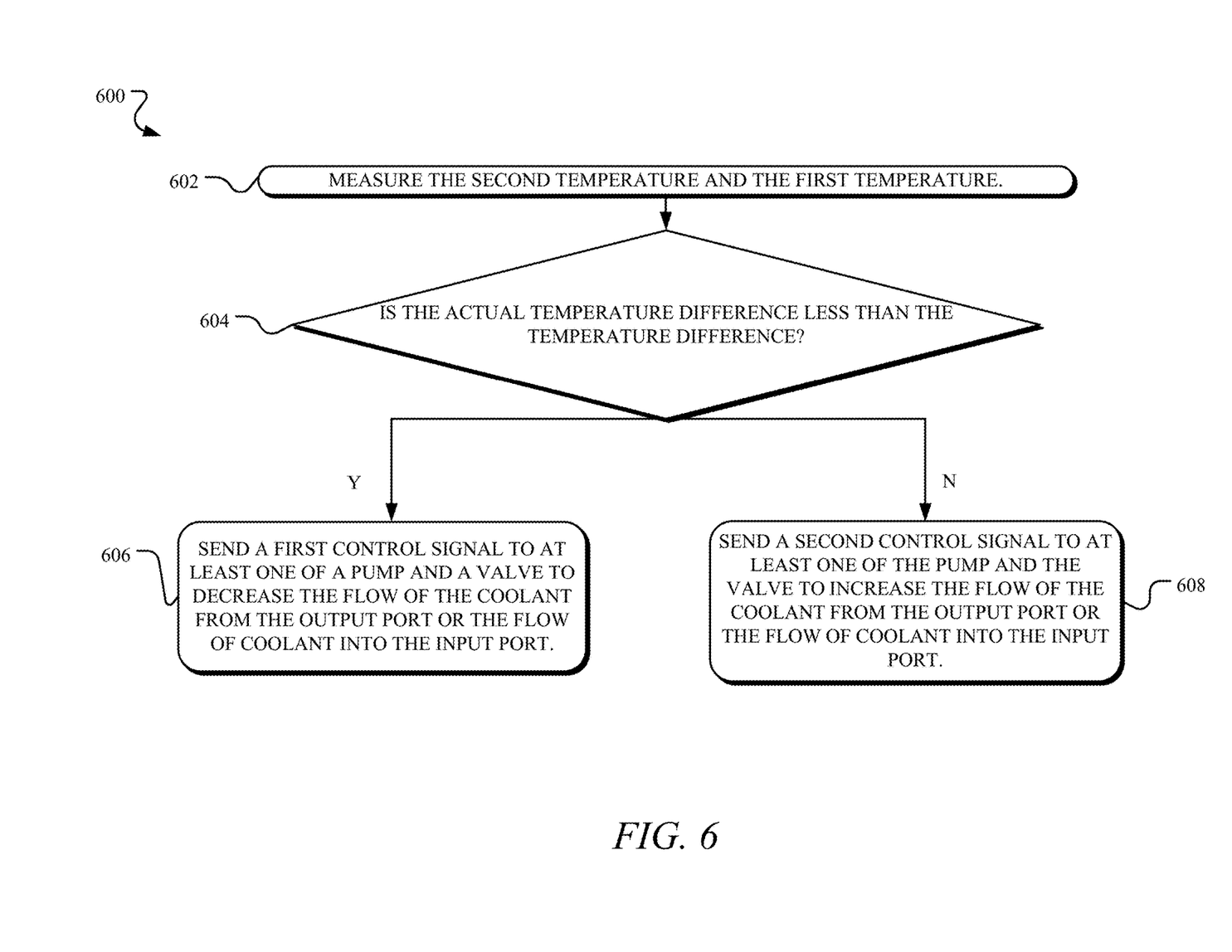
FIG. 6 is a flow chart illustrating a detailed method for maintaining a temperature difference of the coolant.

Turning to FIG. 6, a method 600 for maintaining a temperature difference between the second temperature of the coolant and the first temperature of the coolant is shown. Operation 602 provides for measuring the second temperature and the first temperature. In operation 604, an actual temperature difference 304 is compared to the temperature difference. In operation 606, the controller 250 sends a first control signal to at least one of the pump 220 and the valve 248 to decrease the flow of the coolant from the output port 216 or the flow of coolant into the input port 214 when the actual temperature difference 304 between the second temperature and the first temperature is less than the temperature difference. The flow rate of the coolant can be decreased by opening the valve 248 and modulating the pump 220 to maintain an operable pressure in the system. Alternatively, in operation 608, the controller 250 sends a second control signal to at least one of the pump 220 and the valve 248 to increase the flow of the coolant from the output port 216 or the flow of coolant into the input port 214 when the actual temperature difference 304 between the second temperature and the first temperature is greater than the temperature difference. The flow rate of the coolant can be increased by closing the valve 248 and modulating the pump 220 to maintain an operable pressure in the system. In one example, the supply air 302, the first temperature, and the second temperature are measured to generate the first control signal or the second control signal.

Turning back to FIGS. 1-3, the coolant exits the output port 216 at the second temperature and travels through a first pipe 218 to an air separator 216, shown in FIGS. 2-3. The air separator 216 is configured to remove air from the coolant and is positioned proximate the second side 206. When the coolant exits the air separator 216, the coolant travels through a second pipe 224 to the pump 220. A chemical feeder tank 232 and an expansion tank 228 are coupled to the second pipe 224 by a chemical feeder pipe 234 and an expansion pipe 230, respectively, and are positioned proximate the second side 206. In one example, the chemical feeder tank 232 is a 5 gallon tank. The chemical feeder tank 232 is also adjacent to the first pump 220 and the second pump 222 and is configured to provide chemicals to the coolant through the chemical feeder pipe 234. In one example, the chemical is glycol, which is distributed to the coolant to prevent the coolant system 104 from freezing. The expansion tank 228 is positioned proximate the second side 206 and proximate the chemical feeder tank 232 and is configured to maintain a system pressure in the coolant system 104. In one example, the expansion tank 228 includes a diaphragm with one side in contact with the coolant in the cooling system 104 and the other side in contact with pressurized air, where the pressurized air can contract or expand against the diaphragm to absorb differences in the pressure of the coolant system 104. When the coolant travels through and exits the first pump 220 or the second pump 222, the coolant is circulated to the ACC 106.

The ACC 106 is positioned adjacent to the first side 204 and extends from the second end 202 to the AHU 102. The ACC 106 is configured to cool the coolant from the second temperature to a coolant set temperature, as shown in operation 410 of FIG. 4. In one example, the coolant set temperature is 60 degrees. In another example, the coolant set temperature is 70 degrees. The ACC 106 includes a free cooling assembly 252 having a second cooling coil 240 receiving the coolant at a second intake port 238 from the first pump 220 or the second pump 222, via a third pipe 260, and ejecting the coolant at a second output port 242 to a fourth pipe 262. The free cooling assembly 252 may include a fan configured to circulate an outside ambient air over the second cooling coil 240 to cool the coolant.

The free cooling assembly 252 uses free cooling to cool the coolant. Free cooling uses less power than mechanical cooling, as free cooling only requires the use of a fan and a pump to operate. Free cooling occurs when an outside ambient air temperature 306 is low enough to cool or pre-cool the coolant by circulating the coolant through the second cooling coil 240 and circulating the outside ambient air, which is at a lower temperature than the coolant, over the second cooling coil 240. The free cooling assembly 252 is a closed loop system, resulting in no water loss during use and allows for a more portable and self-sufficient system as water does not need to be continuously supplied to the conditioning system 100 during operation. The ACC 106 also includes a compressor 246 located beneath the free cooling assembly 252 and above the support surface 256. The compressor 246 is configured to receive and mechanically cool the coolant. The compressor 246 receives the coolant from the free cooling assembly 252 or the first pump 220 or the second pump 222, depending on the outside ambient air temperature 306.

Figure 7:
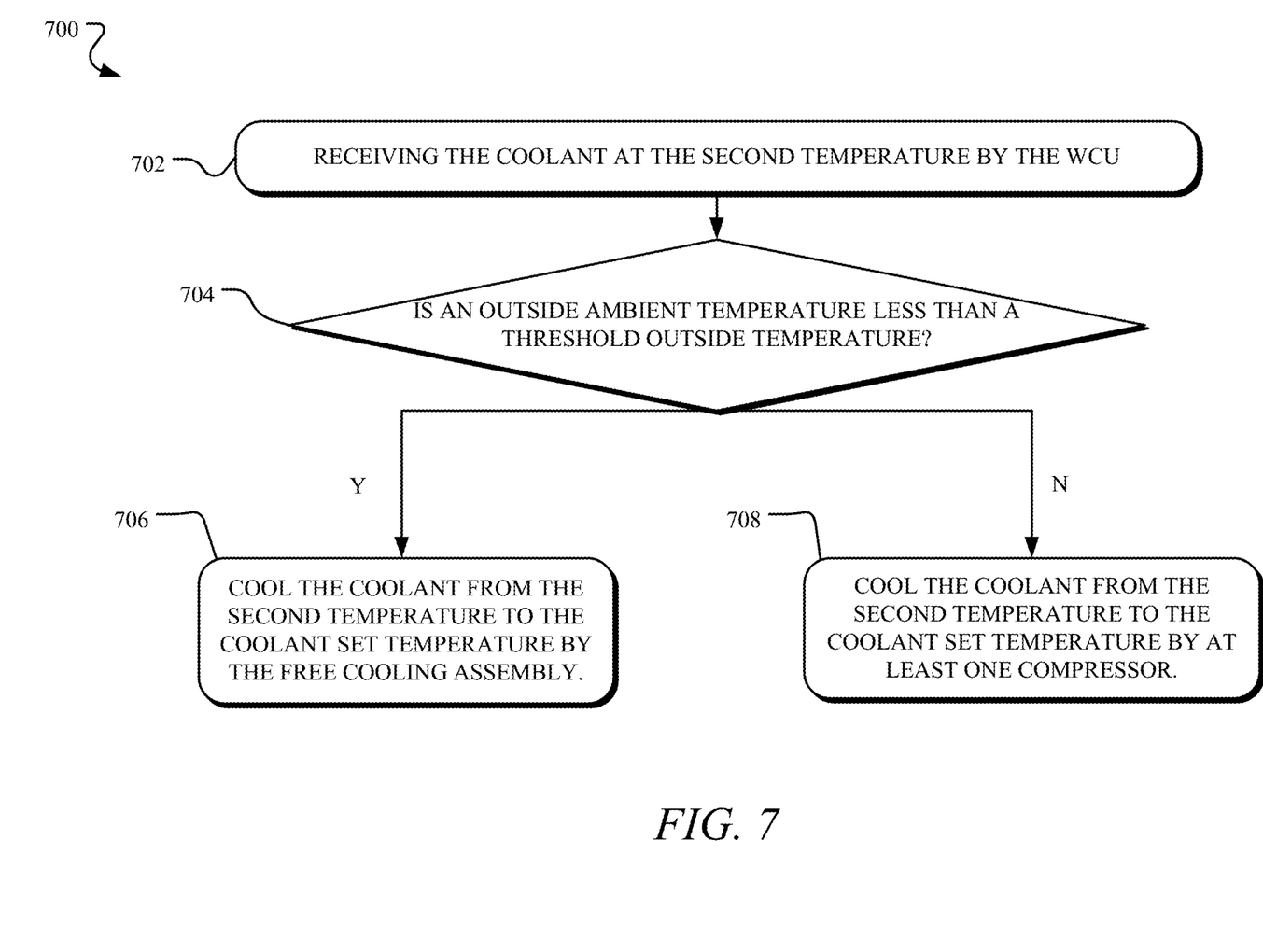
FIG. 7 is a flow chart illustrating a detailed method of cooling the coolant using an air cooled chiller assembly.

Turning to FIG. 7, a method 700 for cooling the coolant from the second temperature to the coolant set temperature using the ACC 106 is provided. In operation 702, coolant at the second temperature is received by the ACC 106. In operation 704, the ACC 106 determines if the outside ambient temperature 306 is less than a threshold outside temperature. In operation 706, if the outside ambient temperature 306 is less than the threshold outside temperature, then the free cooling assembly 252 will cool the coolant from the second temperature to the coolant set temperature. In operation 708, if the outside ambient temperature 306 is greater than the threshold outside temperature, then the compressor 246 will cool the coolant from the second temperature to the coolant set temperature. In one example, the threshold outside temperature is 48 degrees. The free cooling assembly 252 may also be configured to pre-cool the coolant prior to the compressor 246 cooling the coolant when the ambient temperature 306 is within a range of the threshold outside temperature. Pre-cooling saves energy and enhances efficiency of the conditioning system 100, because the compressor 246 will be cooling coolant at a lower temperature, thus the compressor 246 will be using less energy to cool the coolant. In one example, the free cooling assembly 252 may pre-cool the coolant when the outside ambient temperature 306 is within +/−10 degrees of the threshold outside temperature. In other words, the coolant will circulate and pre-cool in the second cooling coil 240 of the free cooling assembly 252, then circulate to the compressor 246, where the compressor 246 will provide additional cooling as required.

Turning back to FIG. 2, the ACC 106 may also include a battery pack assembly positioned above the support surface 256 and below the ACC 106. The battery pack assembly is configured to provide power to the conditioning system 100 for a first timespan. In one example, the first timespan is two hours. The battery pack assembly may also include a fan configured to cool the battery pack assembly during use. The battery pack can be charged before delivery or include a charging assembly. The charging assembly can be, for example, a plug configured to allow the battery pack to be plugged to a power source on site, such as a generator or electrical grid, or a power source on the conditioning system 100, such as a solar panel. The battery pack assembly allows for additional run time of the conditioning system 100, without draining a separate power system, such as a universal power supplier (UPS) or a generator. For example, during a power outage at a data center, the battery pack can provide power to the conditioning system 100 and allow the UPS to solely provide power to data center. The battery pack assembly also allows for the use of the conditioning system in locations where there may not be a power source, such as a shelter located in a natural disaster area.

Turning to FIGS. 2-3, the conditioning system 100 may also include a bypass valve 258 positioned on a fifth pipe 264 extending between the third pipe 260 and the fourth pipe 262. The bypass valve 258 is configured to modulate the amount of coolant entering the ACC 106 or bypassing the ACC 106 to obtain the coolant set temperature. The bypass valve 258 may enhance efficiency of the conditioning system 100. For example, if the outside ambient air temperature 306 is too cool, the coolant will be cooled to a temperature below the coolant set temperature. Rather than mechanically heating the coolant to the coolant set temperature, which would require the use of a large amount of power, the bypass valve 258 can allow coolant at the first temperature, which is higher than the coolant set temperature, to mix in with the coolant until the coolant reaches the coolant set temperature.

The coolant exits the ACC 106 at the coolant set temperature and enters a storage tank 226, via the fourth pipe 262. The storage tank 226 is positioned proximate the second side 206 and between the expansion tank 228 and the AHU 102. The storage tank 226 is configured to store coolant at the coolant set temperature for use during a power outage. During an outage, the storage tank 226 provides coolant to the AHU 102 to continue conditioning the return air for a second timespan. The storage tank 226 acts as a backup to the ACC 106 during a power outage and allows for the conditioning system 100 to continue supplying a conditioned airflow. In one example, the second timespan is fifteen minutes provided by a 1650 gallon tank. In an alternative example, the storage tank 226 is positioned above the support surface 256 and below the ACC 106. This provides for the use of a larger storage tank 226, thus allowing for a longer second timespan. After the coolant circulates through the storage tank 226, the coolant enters a sixth pipe 266 connected to the first intake port 214, where the coolant is circulated and the method 400 of FIG. 4 is repeated.

The conditioning system 100 is not limited to one mobile platform 108 and can be spread across multiple mobile platforms 108. In another embodiment, the conditioning system 100 is spread across two mobile platforms 108, allowing for the use of larger capacity components. The AHU 102 can be positioned on one mobile platform, the ACC 106 positioned on another mobile platform 108, and the coolant system 104 can be spread across the two mobile platforms 108.

The portable free cooling temperature conditioning system 100 provides many benefits. The conditioning system 100 has the capability to condition the space of a large volumetric space such as, but not limited to, warehouses, gymnasiums, manufacturing buildings, or the like. For example, the conditioning system 100 can condition the air of a volumetric space of 900,000 cubic feet. The capacity to condition a large space combined with the portability of the conditioning system 100 provides for easy transportation of the conditioning system 100 to a large space. For example, the conditioning system 100 can be transported to a warehouse, bolted onto the building, and provide conditioning to the warehouse. The warehouse can be easily converted into a data storage center, for example. In another example, the conditioning system 100 can also be transported to emergency areas and provide cooling to a temporary space, such as a shelter.

Several definitions that were applied throughout this disclosure will now be presented. The term "degrees" means "degrees Fahrenheit". The use of relational terms such as, but not limited to, "top," "bottom," "left," "right," "upper," "lower," "down," "up," and "side," are used in the description for clarity in specific reference to the figures and are not intended to limit the scope of the present disclosure or the appended claims.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A free cooling temperature conditioning system comprising:
   an air handling assembly including a first cooling coil including an intake port receiving coolant at a first temperature, the first cooling coil further including an output port for the coolant at a second temperature, the air handing assembly further receiving return air flow from a space being temperature conditioned, the return air flowing over the first cooling coil to condition the return air to supply air, and delivering the supply air into the space being temperature conditioned;
   a pump operably coupled with a coolant system, the pump to control a coolant flowing into the intake port of the first cooling coil;
   a valve operably coupled with the coolant system, the valve to control the coolant flowing from the output port of the first cooling coil;
   a controller configured to maintain a set temperature difference between the second temperature and the first temperature, the controller generating a first control signal to at least one of the pump and the valve to decrease the coolant flowing from the output port or the coolant flowing into the input port when an actual temperature difference between the second temperature and the first temperature is less than the set temperature difference, the controller generating a second control signal to at least one of the pump and the valve to increase the coolant flowing from the output port or the coolant flowing into the input port when an actual temperature difference between the second temperature and the first temperature is greater than the set temperature difference;
a free cooling assembly having a second cooling coil, wherein the free cooling assembly is configured to cool the coolant from the second temperature to a coolant set temperature if an outside ambient air temperature of an outside airflow is less than a threshold outside temperature, the outside airflow flowing out the second cooling coil to cool the coolant from the second temperature to the coolant set temperature;
a compressor operably coupled with the free cooling assembly to mechanically cool the coolant from the second temperature to the coolant set temperature if the outside ambient air temperature is greater than the threshold outside temperature; and
a bypass valve configured to modulate an amount of the coolant entering the free cooling temperature conditioning system and the compressor.

2. The free cooling temperature conditioning system of claim 1, wherein the coolant set temperature is 70 degrees Fahrenheit.

3. The free cooling temperature conditioning system of claim 2, wherein the free cooling assembly is configured to pre-cool the coolant prior to the compressor cooling the coolant when the outside ambient air temperature is between 70 and 80 degrees Fahrenheit.

4. The free cooling temperature conditioning system of claim 1, wherein the supply air, the first temperature, and the second temperature are measured to generate the first control signal or the second control signal.

5. The free cooling temperature conditioning system of claim 1, wherein the pump is a first pump, and further comprising a second pump, wherein the second pump operates if the first pump fails.

6. The free cooling temperature conditioning system of claim 5, further comprising a pump sensor configured, if the first pump fails, to send a failure signal to the controller to activate the second pump.

7. The free cooling temperature conditioning system of claim 1, wherein the space is 900,000 cubic feet.

8. A free cooling temperature conditioning system comprising:
an air handling assembly including a first cooling coil including an intake port receiving coolant at a first temperature, the first cooling coil further including an output port for the coolant at a second temperature, the air handling assembly further receiving return air flow from a space being temperature conditioned, the return air flowing over the first cooling coil to condition the return air to supply air, and delivering the supply air into the space being temperature conditioned;
a pump operably coupled with a coolant system, the pump to control a coolant flowing into the input port;
a valve operably coupled with the coolant system, the valve to control the coolant from the output port;
a controller configured to maintain a set temperature difference between the second temperature and the first temperature, the controller generating a first control signal to at least one of the pump and the valve to decrease the coolant flowing from the output port or the coolant flowing into the input port when an actual temperature difference between the second temperature and the first temperature is less than the set temperature difference, the controller generating a second control signal to at least one of the pump and the valve to increase the coolant flowing from the output port or the coolant flowing into the input port when an actual temperature difference between the second temperature and the first temperature is greater than the set temperature difference;
a free cooling assembly having a second cooling coil, the free cooling assembly configured to cool the coolant from the second temperature to a coolant set temperature if an outside ambient air temperature of an outside airflow is less than a threshold outside temperature, the outside airflow flowing over the second cooling coil to cool the coolant from the second temperature to the coolant set temperature;
a compressor operably coupled with the free cooling assembly to mechanically cool the coolant from the second temperature to the coolant set temperature if the outside ambient air temperature is greater than the threshold outside temperature; and
a bypass valve configured to modulate an amount of coolant entering the free cooling assembly and the compressor.

9. A free cooling temperature conditioning system comprising:
an air handling assembly including a first cooling coil including an intake port receiving coolant at a first temperature, the first cooling coil further including an output port for the coolant at a second temperature, the air handing assembly further receiving return air flow from a space being temperature conditioned, the return air flowing over the first cooling coil to condition the return air to supply air, and delivering the supply air into the space being temperature conditioned;
a pump operably coupled with a coolant system, the pump to control a flow of coolant into the intake port;
a valve operably coupled with the coolant system, the valve to control the flow of coolant from the output port;
a controller configured to maintain a set temperature difference between the second temperature and the first temperature, the controller generating a first control signal to at least one of the pump and the valve to decrease the flow of coolant from the output port or the flow of coolant into the input port when an actual temperature difference between the second temperature and the first temperature is less than the set temperature difference, the controller generating a second control signal to at least one of the pump and the valve to increase the flow of coolant from the output port or the flow of coolant into the input port when an actual temperature difference between the second temperature and the first temperature is greater than the set temperature difference; and
a mobile platform defining a support surface of about 53 feet by 8.5 feet and defining a first end and a second end, the second end opposite the first end, the support surface divided into a first area supporting the air handling assembly, the first area at the first end and along a width of the support surface, the support surface further defining a second area supporting an air cooled chiller, the second area adjacent a third area supporting the coolant system, the second area and the third area extending between the first area and the second end.

10. The free cooling temperature conditioning system of claim 9, wherein the air handling assembly is positioned adjacent the first end and extending from the first side to the second area and the third area.

11. The free cooling temperature conditioning system of claim 10, further comprising an expansion tank within the third area and positioned proximate the second area and proximate the air handling assembly, the expansion tank configured to maintain a system pressure in the coolant.

* * * * *